United States Patent [19]

Williams et al.

[11] 4,227,981
[45] Oct. 14, 1980

[54] ELECTRODIALYSIS OF ACID WHEY
[75] Inventors: Alexander W. Williams, Syracuse, N.Y.; Harry A. Kline, Wonder Lake, Ill.
[73] Assignee: Borden, Inc., Columbus, Ohio
[21] Appl. No.: 71,698
[22] Filed: Aug. 31, 1979
[51] Int. Cl.² ............................................. B01D 13/02
[52] U.S. Cl. .................................. 204/180 P; 204/301
[58] Field of Search ............................. 204/180 P, 301
[56] References Cited
U.S. PATENT DOCUMENTS

| | | | |
|---|---|---|---|
| 3,615,664 | 10/1971 | Francis | 204/180 P X |
| 3,616,386 | 10/1971 | Scheder | 204/180 P |
| 3,755,134 | 8/1973 | Francis et al. | 204/180 P X |
| 3,767,548 | 10/1973 | Okada et al. | 204/180 P |

Primary Examiner—Arthur C. Prescott
Attorney, Agent, or Firm—George P. Maskas; Daniel D. Mast

[57] ABSTRACT

Reduction of ash and titratable acidity in liquid whey is accomplished by electrodialysis, without substantial precipitate formation, by passing at least a portion of the whey through a demineralization unit composed of a number of whey streams each bounded on both sides by brine streams, the streams being separated by cation and anion membranes arranged in an alternate sequence; and passing at least a portion of the whey through a deacidification unit composed of a plurality of whey streams bounded by a brine stream on one side and by a caustic solution stream on the other, the streams being separated by the sequence of cation-anion-anion-cation-etc., membranes wherein the whey stream is disposed between a pair of anion membranes.

14 Claims, 2 Drawing Figures

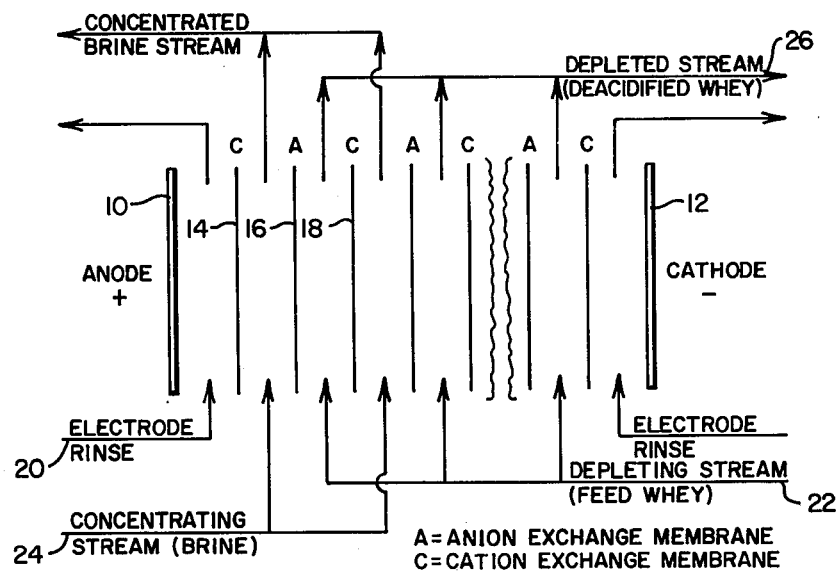
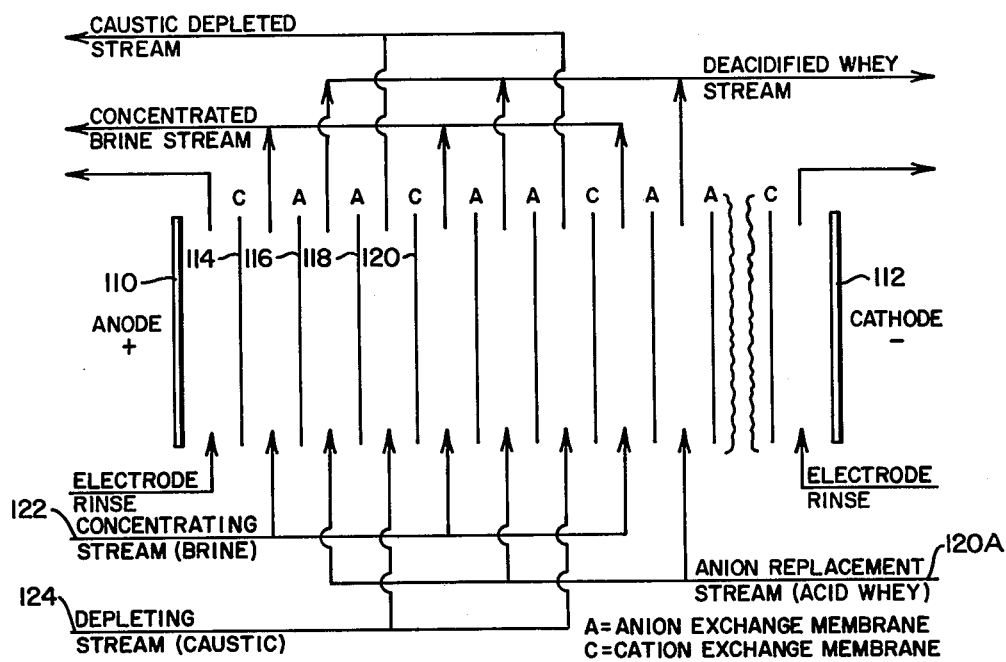

ELECTRODIALYSIS OF ACID WHEY

This invention pertains to demineralization and deacidification of acid whey by electrodialysis which involves passing a portion of a whey stream through two-stream demineralization cells and another portion of the whey stream through three-stream deacidification cells. Refined whey thus produced will have sufficient ash and acidity removed to be used in food products, such as ice cream.

In a more specific aspect, our invention relates to a process for reducing ash content and titratable acidity in liquid acid whey, without forming a substantial precipitate, comprising treating at least a portion of the whey in a demineralization cell and treating at least a portion of the whey in a deacidification cell, the treatment in the demineralization cell comprises passing the whey through a first chamber while passing brine solution through second and third chambers disposed on both sides of the first chamber, the chambers being defined by anion and cation membranes arranged in an alternating sequence, and passing electrical potential between electrodes disposed at opposite ends of the demineralization cell; the treatment in the decidification cell comprises passing a brine solution through a first chamber, passing caustic solution through a third chamber, and passing electrical potential between electrodes disposed at opposite ends of the deacidification cell, the chambers of the cell being in adjoining disposition and are defined by spaced membranes disposed in the sequence of cation-anion -anion-cation wherein the whey chamber is defined by the pair of anion membranes.

Sweet whey solids are an acceptable and approved ingredient in most food formulations, including ice cream. Acid whey solids can be used as an ingredient in only those foods where the characteristic high acid level and flavor are compatible. The use of acid whey solids in ice cream formulations results in undesirable flavors in the finished product. Sweet and acid whey solids differ primarily in that acid whey contains more acid and ash and secondarily, in that acid whey contains slightly less protein and lactose. The literature values for an average analysis of sweet whey solids and the average analysis of our cottage cheese or acid whey are compared below on dry basis (DB):

|  | Sweet Whey (DB) | Cottage Cheese |
| --- | --- | --- |
| Protein % | 13.80 | 11.30 |
| Lactose % | 73.40 | 69.06 |
| Titratrable Acidity % | 1.65 | 8.32 |
| Ash % | 8.75 | 10.98 |
| Sodium mgm/100gm | 1333 | 742 |
| Potassium mgm/100gm | 1935 | 3953 |
| Calcium mgm/100gm | 815 | 1587 |
| Phosphorus mgm/100gm | 1063 | 1020 |

Federal regulations provide, inter alia, that any concentrated cheese whey and dried cheese whey used in ice cream and frozen desserts cannot contribute more that 25% by weight of the total nonfat milk solids content of the the finished product; that dried cheese whey must have an alkalinity of ash not more than 225 mls of 0.10 N hydrochloric acid per 100 grams and titratable acidity of not more than 0.16%, calculated as lactic acid; and that concentrated cheese whey must have an ash alkalinity below 115 mls and titratable acidity of below 0.18%. On dry basis, titratable acidity is about 2.7%, (0.18/0.065). It should be apparent, on the basis of the values presented in the table above, that cottage cheese whey does not comply with federal regulation with respect to titratable acidity, showing an amount thereof of 8.32% whereas it is only 1.65% for sweet whey.

Federal regulations for whey solids for use in ice cream are worded in such a way as to exclude acid whey solids because the specifications specify titratable acidity and ash alkalinity. The reason for these particular specifications is to prevent the use of degraded sweet whey which becomes more acid with time due to bacterial fermentation. Degraded sweet whey can be restored by adding an alkaline substance, such as sodium hydroxide, to neutralize the excess acid. Addition of an alkaline substance also increases ash content of the sweet whey to a higher level, which is characteristic of acid whey.

Cottage cheese and other acid whey solids have a high titratable acidity because they come from acid precipitated milk, in contrast to enzyme precipitation in the case of sweet whey. Ash alkalinity is high in acid whey due to the solubilization of calcium phosphate by the high acid level. The high acidity and ash alkalinity is not a characteristic of poor quality in the case of acid whey, however, these values should be reduced, especially acidity, in order to make these solids compatible in most food formulations.

It has been shown by actual comparison tests that our refined acid whey solids contribute to improved body and texture characteristics in ice cream and the flavor is comparable to that using sweet whey solids.

The preferred embodiment of the invention described and claimed herein is illustrated in the appended drawings wherein:

FIG. 1 is a schematic diagram of a two-stream demineralization unit showing a plurality of acid whey streams bounded by brine streams, the stream being separated by anion and cation membranes arranged in alternate sequence.

FIG. 2 is a schematic diagram of a deacidification unit wherein the acid whey stream is bounded on one side by a brine stream and on the other side by a caustic solution stream, the streams being separated by membranes arranged in the sequence of cation-anion-anion-cation, etc., with each whey stream being disposed between the anion membranes.

The two-stream demineralization and three-stream deacidification electrodialysis systems are known individually. The two-stream system is covered by U.S. Pat. No. 2,848,403 and it has been alleged that Aqua-Chem, Inc., has filed for patent coverage on the three-stream system.

The two-stream is illustrated in FIG. 1 which includes anode 10 at one end and cathode 12 at the other end in a spaced relationship. A plurality of cells are disposed between the anode and cathode each being defined by cationic membrane 14 disposed in spaced relationship to anionic membrane 16 and another cationic membrane 18 which is spaced from anionic membrane 16. As should be now apparent, the membranes are arranged in alternate fashion of cationic-anionic-cationic-anionic-cationic etc., with as many cells as may be required. Electrodes are space from the end cationic membranes to allow electrode rinse solution 20 to flow between an electrode and the spaced cationic membrane. Whey stream 22 is introduced between a pair of spaced anion and cation membranes with a brine stream 24 on either side thereof, as illustrated. Anions such as chloride, sulfate, phosphate, lactate, etc., pass under the influence of impressed electromotive force from the whey into the brine through the anion membrane. Cations such as sodium, potassium, calcium, magnesium, etc., pass into the brine from whey through cation membrane. The whey thus becomes depleted of ash and the brine increases in ash content. With the increase in ash, the brine solution becomes more conductive and should be diluted to maintain steady operating conditions. Deionized whey stream 26 and concentrated brine stream 28 are withdrawn, as shown.

FIG. 2 illustrates the three-stream deacidification electrodialysis system which is characterized by a pair of electrodes disposed in spaced relationship to each other, anode 110 at the left and cathode 112 at the right. Cells are disposed between the electrodes but in a different arrangement than in the two-stream demineralization system. The membranes in this system include, from left to right, cationic membrane 114 spaced from the anode, anionic membrane 116 spaced from membrane 114, an other anionic membrane 118 spaced from anionic membrane 116 and cationic membrane 120 spaced from membrane 118. The membrane assembly, therefore, is in the order of cation-anion-anion cation-anion-anion-cation-etc. Whey stream 120A is introduced between a pair of anion membranes with brine stream 122 and sodium hydroxide stream 124 on either side thereof to give the flow arrangement of brine-whey-caustic-brine-whey-caustic-etc. Hydroxyl ions from the caustic stream pass through the anion permeable membrane 118 into the whey and sodium ions from the caustic stream pass through the cation-permeable membrane 120 into the brine stream which is adjoining to the caustic stream. The hydroxyl ions transferred to the whey combine with hydrogen ions of the lactic acid to form water, and both ions are thus removed. The acidity in acid whey is due mainly to the presence of lactic acid, removal of which, of course, reduces the acidity of whey. Other anions such as chloride, sulfate, phosphate, lactate etc., pass from the whey stream through the anion membrane into the brine stream which becomes ionically balanced with sodium ions received from the caustic stream.

The three-stream system operates to decrease titratable acidity in the whey stream without increasing its ash content. The whey and caustic streams both give up ions to the brine stream. Alkalinity of the caustic stream must be continuously replenished by introducing sodium hydroxide and the brine stream must be continuously diluted to prevent an excessive increase in conductivity.

In order to present a comparison of the two systems, operating data for a depletion level of 50% titratable acidity for several runs from each system was summarized and is presented below:

|  | Two Stream Demineralization | Three Stream Deacidification |
| --- | --- | --- |
| Operating hours | 5.79 | 12.22 |
| Pounds total solids (T.S.) | 67.14 | 481.00 |
| Pounds acid removed | 3.12 | 22.14 |
| KWH used | 7.00 | 16.92 |
| Sq. ft. membrane | 38 | 38 |
| Pounds Acid/hr. | .539 | 1.812 |
| Pounds T.S./hr. | 11.596 | 39.362 |
| KWH/lb. acid | 2.244 | 0.764 |
| KWH/lb. T.S. | .104 | 0.035 |
| Lbs. Acid/hr/sq. ft. membrane | .014 | 0.048 |
| Lbs. T.S./hr./sq. ft. membrane | .305 | 1.036 |

The above comparative data shows that the three-stream system is about three times as efficient as the two-stream system. In view of the continually rising costs, of special significance is the value of 0.104 KWH per pound of total solids treated in the two stream system versus the value of 0.035 for the three-stream system. Although the three-stream system was operated for 12.22 hours whereas the two-stream system for only 5.79 hours, the former treated about 481 pounds of total solids whereas the two-stream system treated only about 67 pounds, a ratio of about 7 to 1. This is indirectly verified by pounds of total solids treated per hour per square foot of membrane which shows relative values of 1.036 versus 0.305 for the two-stream system. As was expected, the three-stream system removed 1.8 pounds of acid per hour to only 0.54 pounds for the two-stream system.

These two systems operating separately produce different products. In the two-stream system, pH of the resultant whey at 75% depletion level of titratable acidity is about 5.3–5.5 and at the 50% level, pH is about 4.9–5.0. The ash is removed to an extent equal to the acid at the 75% level with Na, K, Ca and P being removed at about 74%, 95%, 74% and 62%, respectively. At the 50% level, the % ash depletion of 55% is greater than the acid with Na, K, Ca and P being removed at about 68%, 88%, 55% and 52% respectively.. Demineralization of acid whey results in removal of cations which contribute to high alkalinity. Removal of these cations is reflected in a decreased buffering effect of the ash and titratable acidity can be reduced without a great increase in whey pH. The potassium content in the ash is reduced most significantly, followed by reduction of calcium and phosphorus. The other materials are also reduced to a lesser extent. Generally speaking, the monovalent ions are removed preferentially to divalent and trivalent ions.

The two-stream system of brine and whey results in the removal of both acid and ash from the whey. It was found that a 50% reduction in titratable acidity is sufficient for elimination of acid flavor. At this level, there is 55% reduction in ash. As the percentage of acid removal increased, there is a greater increase in ash reduction. Ice cream produced using whey solids treated in the two-stream system has a firmer body and finer texture than that made from normal sweet whey solids. This system of electrodialysis uses more electrical power than the other systems in that the removal of ash from the whey drastically reduces its conductivity and higher voltages are required to maintain direct current flow.

The three-stream system has a very different effect on pH of the treated whey. At the 75% depletion level of titratable acidity, the pH of the whey is about 6.5 and there is a precipitate present. At the 50% level, the pH is about 5.8 and the precipitate is absent. This precipitate seems to be mainly some form of calcium phosphate, together with some organic component, which was first discovered during operation of a pilot plant deacidification unit. We have also found that, following shut-down, a noticeable amount of precipitate comes out of the stack with the rinse water.

The ash depletion using the three-stream system is significantly reduced in comparison with the two-stream operation in that at the 50% level, the D.B. ash removal amounts to about 5% in comparison to about 55% in the two-stream. The total solids recovery is also greatly improved in the three-stream system.

During a run with the three-stream system, we have noticed a loss in alkalinity in the caustic stream and an increase in alkalinity in the brine stream. In order to control precipitation in the brine stream, we have added hydrochloric acid to maintain pH of 5 to 5.5. Apparently, any acid should work acceptably. Alkalinity of the caustic stream was maintained at 1.5% titratable NaOH by the addition of 50% caustic solution.

The three-stream system of brine, whey and caustic results in reduction of acidity without loss of ash. In this system, hydroxyl ions are transferred from the caustic stream into the whey where they react with hydrogen ions of the acid to form water which is an unionizable substance. Some of the lactate ions are transferred from the whey into the brine but the main anion transfer in this system is chloride. A slight precipitate of calcium phosphate is formed at the anion membrane surface on the cathode side of the whey stream and may cause an increased clouding of the whey. This system is 2.5 to 3 times faster in titratable acid reduction than the two stream system with a similar saving in electrical power. Ice cream made with whey solids from the three-stream deacidification system is softer in body than that from normal sweet whey due to non-removal of monovalent cations such as and sodium and potassium. The whey pH is also higher due to the monovalent cations. A 50% reduction of titratable acidity was found to be best for this system in many respects, including a limited precipitate formation.

As was earlier described, federal regulations for ice cream require that titratable acidity of concentrated whey be less than 0.18%, calculated as lactic acid. At this level of acidity, pH of whey is about 6.2 to 6.3. When Aqua-Chem's deacidification three-stream system was introduced to us, we were assured by Aqua-Chem's representatives that their three-stream system will deacidify acid whey to the desired level of titratable acid. Upon installation of a pilot scale model of the three stream system, it was discovered that deacidification of acid whey to the desired level of acidity was not possible due to precipitation of what was later found to be calcium phosphate. Experimental data has verified that calcium phosphate precipitate starts forming at pH of about 5.9 and increases at higher pH values. With this experience, it was decided to reduce ash content in acid whey in order to eliminate formation of the precipitate. This was accomplished by the use of the two-stream demineralization system in conjunction with the three-stream deacidification system whereby the two-stream system removes sufficient ash and whatever other substances there might be to permit deacidification without substantial precipitate formation.

In the treatment of cottage cheese by the combined systems, care must be exercised to balance deacidification and demineralization operations to prevent precipitation of calcium phosphate which becomes insoluble at pH in excess of about 6, as was already described. Balancing demineralization and deacidification can be accomplished by making separate stacks of two-stream and three-stream cells or making a hybrid stack which contains the desired ratio of the two types of cells. By a proper arrangement of cells, it is possible to control the ratio of ash to acid removal. The rate of processing by the use of the combination system is somewhat decreased when compared to a three-stream system but it is still at least twice as fast as the two-stream system.

An ice cream of very satisfactory quality can be made using cottage cheese whey solids processed by the combination system to an end point of about 60% reduction of titratable acidity and an ash reduction of about 15 to 20%. Such a product was produced using a stack arrangement which consisted of 44% demineralization cells and 56% deacidification cells. Pertinent data is summarized in the table below:

|  | Original Whey | Finished Whey | % Change |
| --- | --- | --- | --- |
| Lbs. Whey | 1682 | 1648 |  |
| % T.S. | 5.99 | 5.73 |  |
| pH | 4.45 | 5.90 |  |
| Analysis on D.B. |  |  |  |
| % Titratable Acid | 9.01 | 3.84 | −57.38 |
| % Ash | 11.19 | 8.90 | −20.46 |
| % Na | .603 | .504 | −16.41 |
| % K | 3.072 | 2.302 | −25.06 |
| % Ca | 1.800 | 1.605 | −10.83 |
| % P | 1.224 | 0.995 | −18.71 |
| % Cl, expressed as NaCl | 3.170 | 1.220 | −61.51 |

The invention claimed herein is further illustrated by actual operation in a commercial plant which is described in the example, below.

EXAMPLE

After clarifying and pasteurizing, cottage cheese whey is delivered to a storage tank at a solids content of about 6% and pH of about 4.5. It is then electrodialyzed in about 3 hours under recirculation through one demineralization stack and two deacidification stacks to an end point titratable acidity of 3% or less, on dry basis. Acidity in the treated whey is reduced by about 60%, ash by at least 10% and pH of whey is about 6.0.

The treated whey is then concentrated, cooled, seeded with lactose crystals and stored under agitation for delivery to a customer.

Electrodialysis of whey will now be described in more detail. The clarified and pasteurized whey at 116° to 120° F. is electrodialyzed by split flow recirculation through one demineralizing stack of 100 cells and two deacidifying stacks of 75 cells each. The cation membranes used were MC-3470 and the anion membranes were MA-3475, which can be obtained from Ionac Chemical Company. These membranes are 40″×120″, each is 15 mils thick, have good dimensional stability, chemical stability up to 125° C., and other parameters which are available from a specification sheet. Spacing between membranes in the demineralization and deacidification stacks is about 1/8 of an inch. Additional available data is given in the table below for the stacks wherein stack #1 is two-stream demineralization and stacks #2 and #3 are deacidification mode.

|  | Power |  | Flow Rate |  |  |
| --- | --- | --- | --- | --- | --- |
| Stack No. | Voltage | Amps | Whey | Caustic | Brine |
| #1 | 100–150 | 45–60 | 233 | — | 154 |
| #2 | 240–260 | 90–110 | N180–190 | 140 | 135 |
| #3 | 220–260 | 90–110 | 180 | 145 | 135 |

The values for whey, caustic and brine streams are given in gallons per minute. The brine stream is a sodium chloride solution having 20,000 mmhos conductivity and pH of about 2.5. Conductivity of the brine solution is maintained by diluting it with water and pH is controlled by addition of hydrochloric acid. The caustic stream is 50% caustic soda diluted to 20,000 mmhos with a pH of about 12. The depleted caustic stream is replenished with 50% sodium hydroxide. The electrode rinse is sodium acetate solution of 20,000 mmhos conductivity and pH of about 5. Its efficiency is maintained by addition of acetic acid.

The whey streams are pumped through the stacks and returned to storage through an intermediate tank. The whey is thusly recirculated through the stacks until a titratable acidity of 3% (D.B.) or less is reached. It should be apparent that, with every pass, the whey is gradually being reduced in ash content by the demineralization stack #1 and in acidity by the deacidification stacks #2 and #3. As the pH of the whey reaches about 6, sufficient ash and other matter has been removed to minimize formation of a precipitate. Additional data and analysis for the subject run is presented below:

|  | Start | Finish |
| --- | --- | --- |
| Gallons of whey | 10,120 | 10,080 |
| % Total Solids | 6.54 | 6.01 |
| % Titratable Acidity | 0.50 | 0.162 |
| pH | 4.60 | 6.25 |
| % Ash | 11.01 | 9.65 |
| % Na | 0.87 | 0.95 |
| % K | 2.23 | 1.86 |
| % Ca | 1.77 | 1.67 |
| % P | 1.12 | 0.86 |
| % Mg | 0.18 | 0.17 |

The figures above demonstrate that titratable acidity has been reduced by about 68% and ash content, by about 12%.

We claim:

1. Process for reducing ash content and titratable acidity in liquid whey, without forming a substantial precipitate, comprising treating at least a portion of the whey in a demineralization cell and treating at least a portion of the whey in a deacidification cell under the influence of electrical current, the treatment in the demineralization cell comprises passing the whey through a first chamber while passing brine solution through second and third chambers disposed on both sides of the first chamber, the chambers are in adjoining disposition and are defined by anion and cation membranes arranged in an alternating sequence; the treatment in the deacidification cell comprises passing a brine solution through a first chamber, passing the whey through a second chamber, and passing caustic solution through a third chamber, the chambers of the cell are in adjoining disposition and are defined by spaced membranes disposed in the sequence of cation-anion-anion-cation wherein the whey chamber is defined by the pair of anion membranes.

2. Process of claim 1 including the steps of conveying treated whey from the demineralization cell to a storage zone, conveying treated whey from the deacidification cell to the same storage zone, recirculating whey in the storage zone through the cells until the desired reduction of ash and acidity is attained.

3. Process of claim 1 wherein whey is treated by passing and recirculating same through a plurality of demineralization cells and a plurality of deacidification cells disposed between the electrodes.

4. Process of claim 2 wherein the feed whey has solids content of about 6 to 7% and pH of about 4.5.

5. Process of claim 4 wherein the brine solution has a conductivity of about 20,000 mmhos and a pH of about 2.5 and the caustic solution has a conductivity of about 20,000 mmhos and pH of about 12.

6. Process of claim 4 including the steps of adding water and hydrochloric acid to the brine solution to maintain the desired conductivity and pH and adding caustic to the caustic solution to maintain the desired conductivity and pH.

7. Process of claim 4 including the steps of passing a sodium acetate electrode rinse solution between each electrode and the adjoining spaced cation membrane.

8. Process of claim 7 wherein the sodium acetate solution has a conductivity of about 20,000 umhos and a pH of about 5.

9. Process of claim 8 including the step of adding acetic acid to the sodium acetate solution to maintain the desired conductivity and pH.

10. Process of claim 8 wherein the feed whey is cottage cheese whey which has solids content of about 6 to 7% and pH of about 4.5.

11. Process of claim 4 including the step of recovering treated liquid whey having pH in excess of 6 and titratable acidity of less than about 3.

12. Process of claim 11 wherein whey is passed through plurality of demineralization cells arranged in one stack and a plurality of deacidification cells arranged in a separate stack.

13. Process of claim 11 wherein whey is passed through a plurality of demineralization cells and a plurality of deacidification cells arranged in a stack.

14. Process of claim 11 wherein the demineralization and deacidification cells are disposed between anode and cathode electrodes, the process including the step of passing direct current through the cells from one electrode to the other.

* * * * *